US008998244B2

(12) United States Patent
Purdue

(10) Patent No.: US 8,998,244 B2
(45) Date of Patent: Apr. 7, 2015

(54) WHEELCHAIR WITH DETACHABLE WALKER

(71) Applicant: Carole Purdue, Centerville, MD (US)

(72) Inventor: Carole Purdue, Centerville, MD (US)

( * ) Notice: Subject to any disclaimer, the term of this patent is extended or adjusted under 35 U.S.C. 154(b) by 0 days.

(21) Appl. No.: 14/358,921

(22) PCT Filed: Nov. 16, 2012

(86) PCT No.: PCT/US2012/065550

§ 371 (c)(1),
(2) Date: May 16, 2014

(87) PCT Pub. No.: WO2013/074945

PCT Pub. Date: May 23, 2013

(65) Prior Publication Data

US 2014/0300071 A1 Oct. 9, 2014

Related U.S. Application Data

(60) Provisional application No. 61/629,426, filed on Nov. 18, 2011.

(51) Int. Cl.

| | |
|---|---|
| ***B62B 1/00*** | (2006.01) |
| ***A61G 5/14*** | (2006.01) |
| ***A61G 5/02*** | (2006.01) |
| ***A61G 7/10*** | (2006.01) |
| ***A61H 3/04*** | (2006.01) |

(52) U.S. Cl.

CPC *A61G 5/14* (2013.01); *A61G 5/022* (2013.01); *A61G 7/1038* (2013.01); *A61H 3/04* (2013.01); *A61G 2200/34* (2013.01); *A61G 2200/36* (2013.01); *A61H 2201/1633* (2013.01); *A61G 5/02* (2013.01)

(58) Field of Classification Search

USPC .......... 280/640, 647, 656, 657; 5/81.1, 503.1, 5/662

See application file for complete search history.

(56) References Cited

U.S. PATENT DOCUMENTS

| | | | | |
|---|---|---|---|---|
| 3,584,890 | A * | 6/1971 | Presty | 280/7.1 |
| 3,999,778 | A * | 12/1976 | Markiel | 280/304.1 |
| 5,320,122 | A * | 6/1994 | Jacobson et al. | 135/66 |
| 5,451,193 | A * | 9/1995 | Pickard | 482/68 |
| 5,697,628 | A * | 12/1997 | Spear | 280/304.1 |
| 6,374,436 | B1 * | 4/2002 | Foster et al. | 5/81.1 R |
| 6,467,797 | B1 * | 10/2002 | Lofy et al. | 280/647 |
| 6,669,287 | B1 * | 12/2003 | DeLilla | 297/243 |
| 7,040,637 | B2 * | 5/2006 | Owens et al. | 280/87.021 |
| 8,714,171 | B1 * | 5/2014 | Haygood | 135/66 |
| 2002/0084617 | A1 * | 7/2002 | Torsiello | 280/250.1 |
| 2009/0152826 | A1 * | 6/2009 | Silva et al. | 280/47.34 |
| 2011/0006494 | A1 * | 1/2011 | Walker | 280/7.17 |

* cited by examiner

*Primary Examiner* — John Walters
*Assistant Examiner* — James Triggs
(74) *Attorney, Agent, or Firm* — Klauber & Jackson LLC

(57) ABSTRACT

A wheelchair having a detachable walker. The walker can be mechanically attached and detached from the wheelchair easily so that the user can safely rise from a sitting position on the wheelchair to a standing position assisted by the walker. During that transition, the user has the wheelchair attached to the walker in case the user falls backwardly or gets tired and wants to again be seated in the wheelchair. When the user has reached the standing position, the user can ambulate in a space intermediate the walker and the wheelchair or simply detach the walker from the wheelchair and continue ambulating while relying solely on the walker for support.

10 Claims, 3 Drawing Sheets

WHEELCHAIR WITH DETACHABLE WALKER

CROSS REFERENCE TO RELATED APPLICATIONS

The present application is a National Stage Application claiming the priority of co-pending PCT Application No. PCT/US2012/065550 filed Nov. 16, 2012, which in turn, claims priority from U.S. Provisional Application Ser. No. 61/629,426, filed Nov. 18, 2011, and U.S. Non-Provisional application Ser. No. 13/385,894, filed Mar. 13, 2012. Applicant claims the benefits of 35 U.S.C. §120 as to the PCT application and the U.S. Non-Provisional Application, and priority under 35 U.S.C. §119 as to the said U.S. Provisional application, and the entire disclosures of all applications are incorporated herein by reference in their entireties.

BACKGROUND OF THE INVENTION

The present invention relates to a wheelchair for moving a patient, and, more particularly, to a wheelchair with a detachable walker so as to reduce the possibility of a patient falling and being injured.

Each year a typical nursing home reports 100 to 200 falls with approximately 35% of the falls resulting in injuries. It is also reported that over 80% of the falls occur among residents who cannot walk and, instead, use wheelchairs for their mobility and seating needs.

Falls among hospital inpatients are common as well. Approximately 30% of hospital falls result in injury. Patients who fall and sustain an injury are reported to have hospital charges over $4,200 higher than patients who do not fall. According to a 2009 report by the CDC, the total direct and indirect cost of all fall injuries for people 65 years and older exceeded $19 billion in 2000. By 2020, the annual direct and indirect cost of fall injuries is expected to reach $54.9 billion. The average cost of one fall for an older adult totaled $19,440 which included hospital, nursing home, emergency room, and home health care.

Furthermore, these costs do not include the long-term effects of falls such as dependence on others, lost time from activities, difficulty performing personal care and household duties, pain and suffering and reduced quality of life. Prevention of falls in both hospital settings and long term care settings is therefore an important patient safety and public health issue.

One of the areas where persons are likely susceptible to falls is in the transition of a patient from a wheelchair to a standing, ambulatory stance. The problem arises in that there are certain individuals who are strong enough to get up out of their wheelchair but do not have adequate balance to ambulate alone and are at a high risk for falling.

Such individuals often have cognitive impairment as well and have decreased safety awareness and the inability to acknowledge their functional limitations. This population may include, but is not limited to, residents living in dementia and Alzheimer's care facilities, other nursing home residents, hospitalized patents suffering from post op confusion or altered mental status, stroke victims and traumatic brain injury patients.

As such, the risk of a fall is great where such patients try to arise from a wheelchair to a standing position and/or try to transition from a wheelchair to a walker so as to ambulate on their own supported solely by the walker.

It would, therefore, be advantageous to have a wheelchair that can facilitate the transition of a patient from a sitting position on a wheelchair to a standing position to continue ambulation with a walker by providing a combination of a wheelchair and walker that can be attached to and detached from the wheelchair so that the wheelchair can act as a safety device in the event the patient loses his or her balance and falls backward.

It would also be advantageous to have a combination wheelchair and walker detachably attached together where there is a space intermediate the wheelchair and walker for the person to ambulate in a protective environment.

It would be further advantageous to have the walker readily detachable from the wheelchair so that the patient can continue ambulating solely with the support of the walker.

SUMMARY OF THE INVENTION

Accordingly, the present invention combines technologies to create a new, innovative mobility wheelchair and walker combination that addresses the wheelchair user's needs in one basic design.

One of the key components of the present invention is that the walker readily attaches and detaches from the wheelchair. The combination wheelchair and walker is designed to prevent falls for a person transitioning from the sitting position on a wheelchair to an ambulatory standing position being supported by a walker.

When an individual is sitting in the wheelchair, a caregiver can attach the walker to the front of the wheel chair by an attachment system. In the exemplary embodiment, the attachment system is comprised of securing downwardly directed members into attachment sockets. The downwardly directed members secure into the attachment sockets easily and quickly and allow a caregiver to facilitate the attaching and detaching of the walker to the wheelchair.

As such, once the walker is attached to the wheelchair, the wheelchair's user will have the capability of standing up, holding on to the walker and ambulating while the wheelchair remains behind and attached to the walker to allow the user to sit back down. The walker and wheelchair can move individually or be locked in place, reducing the risk of falls during unsupervised activities.

With the present invention, the user can stand up from the sitting position on the wheelchair and grasp the handle of the walker and remain in the space between the wheelchair and the walker so as to ambulate with the safety of the wheelchair behind the user in the event that user needs to sit down again.

As another alternative, the caregiver can fully separate the walker from the wheelchair once the user has risen to the standing position and has grasped the walker so that the wheelchair can be left behind and the user can continue to ambulate with the sole support of the walker disconnected from the wheelchair.

These and other features and advantages of the present invention will become more readily apparent during the following detailed description taken in conjunction with the drawings herein.

DETAILED DESCRIPTION OF THE INVENTION

Figure 1:
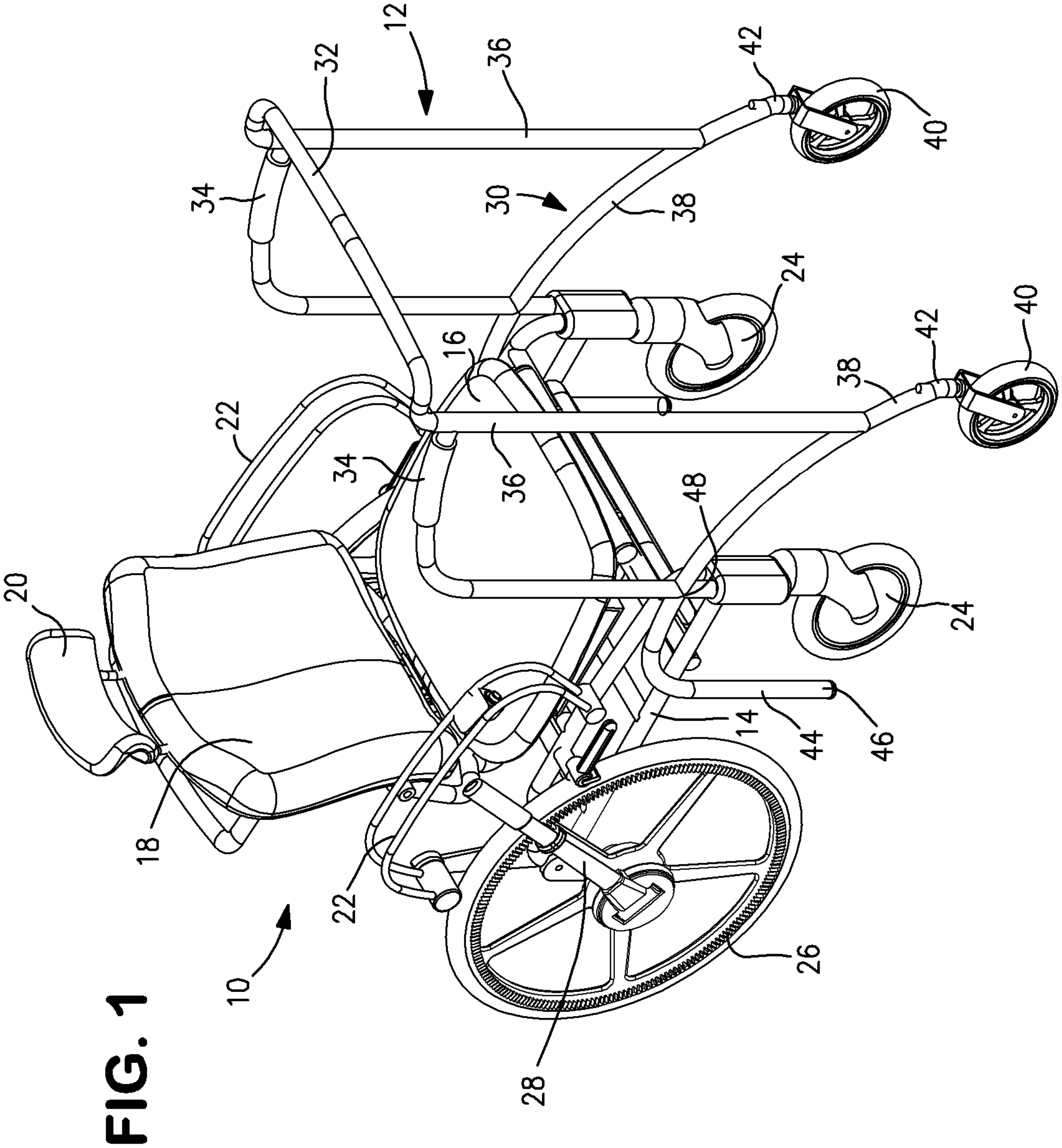
FIG. 1 is a perspective view of a combination of a wheelchair and a walker attached together.
Figure 2:
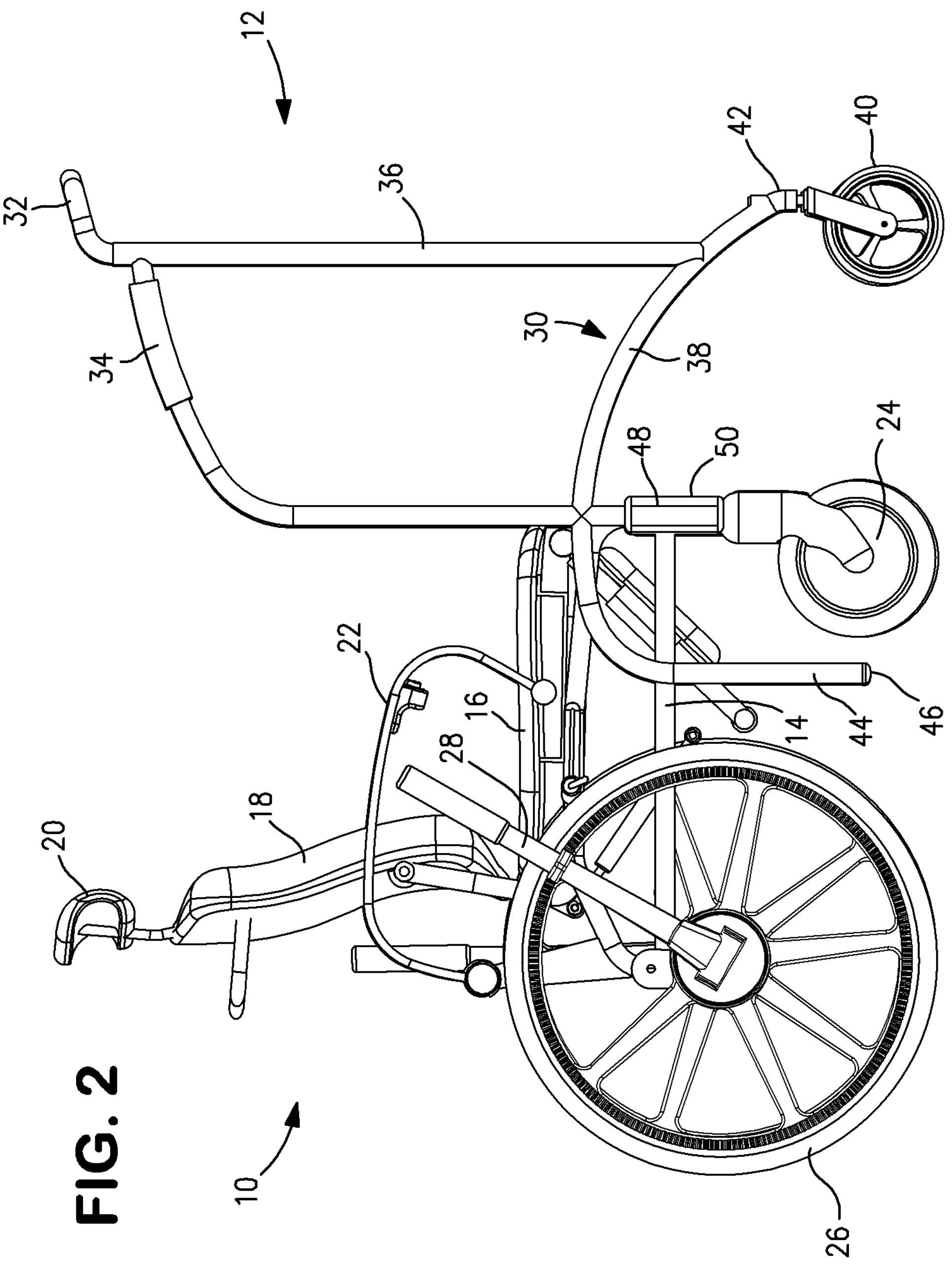
FIG. 2 is a side view of the combination wheelchair and walker of FIG. 1.
Figure 3:
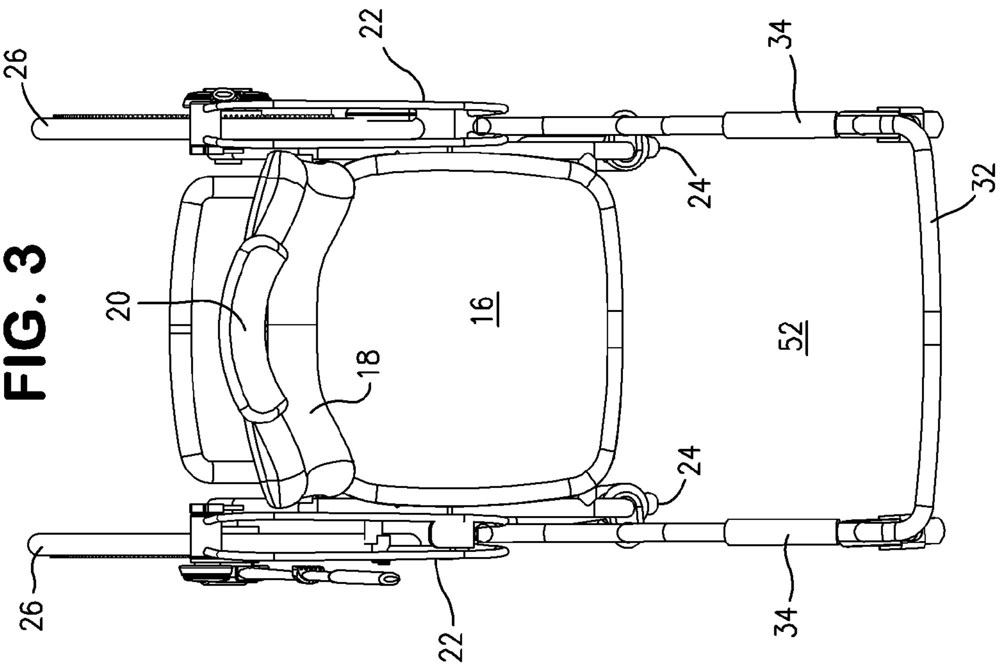
FIG. 3 is a top view of the wheelchair and walker of FIG. 1.

Referring now to FIGS. 1-3, there is shown, a perspective view, a side view and a top view of a combination of a wheelchair 10 and a walker 12 attached together. As can be seen, the wheelchair 10 has a wheelchair frame 14 that incorporates a lower seat 16 as well as a back support 18 for holding the user in the proper sitting position within the wheelchair 10.

A head support 20 may be provided that extends upwardly from the back support 18, again, for supporting the head of the user. Additionally, there may be arm supports 22 that are provided on each lateral side of the lower seat 16 for supporting the arms of the user.

A set of swiveled front wheels 24 are located at the front of the wheelchair 10 so as to allow the wheelchair 10 to freely roll along a planar surface. As used herein the term "front" will be the area of the wheelchair 10 and walker 12 that is in the direction the user is facing when seated in the wheelchair and the term "rear" will be the opposite area of the wheelchair 10 and walker 12. In a similar manner, a "forward" movement will be movement in the direction the user is facing when seated in the wheelchair and a "rearward" movement will be movement of the wheelchair in the opposite direction.

There are two drive wheels 26 that are located along the lateral sides of the wheelchair 10 (only one of which is shown in FIG. 1). The drive wheels 26 may be of the conventional type where the drive wheels 26 are manually grasped and rotated by the user in a forward or reverse direction to propel the wheelchair 10.

Alternatively, the drive wheels 26 may, as in the exemplary embodiment of FIGS. 1-3, be of a type wherein the user manipulates a pair of lever arms 28 by utilizing a pushing or pulling motion of the arms to move the drive wheels 26 simultaneously so as to move the wheelchair 10 in a forward or reverse direction or individually to turn the wheelchair 10 in a desired direction.

Turning then to the walker 12, the walker 12 is comprised of a frame 30 of a standard nature in that it includes an upper handle 32 and side supports 34. As is conventional, the user can grasp the upper handle 32 for support during ambulation or can grasp both of the side supports 34 for support during that ambulation. In either case, the user is normally in the upright, standing position.

The walker 12 also includes two forward struts 36 that extend from the upper handle 32 to bottom members 38, that serve to support the upper handle 32. As such, the bottom members 38 extend rearwardly from a pair of front wheels 40, which may be swiveled wheels 40, to be attached to the lower ends 42 of the bottom members 38.

In the exemplary embodiment, there can also be seen rear supports 44 having support legs 46. It should be noted that the present invention may be constructed as the exemplary embodiment of FIGS. 1-3 or in an alternative embodiment. To carry out the present invention, the walker 10 should preferable include the upper handle 32, the front wheels 40 and the support legs 46 at the rear of the walker 12. The support legs 42 may actually also be wheels consistent with the present invention.

In any event, the walker frame 30 includes a pair of downwardly directed members 48 that extend downwardly and which interfit into hollow attachment sockets 50 that are affixed to the wheelchair 10. As such, an attachment system is formed that allows the walker 12 to be attached to the wheelchair 10 and detached from the wheelchair 10 in a relatively easy manner to facilitate such attachment and detachment.

When the walker 12 is in its attached position and thus joined to the wheelchair 10, it can be seen that the interfitting of the downwardly directed members 48 into the hollow attachment sockets 50 are dimensioned such that the support legs 46 are located above the planar surface, such as a floor, upon which the wheelchair 10 and walker 12 rest.

That attachment system, in the exemplary embodiment, allows the walker 12 to be raised and lowered vertically in order to carry out the detaching and attaching of the walker 12 and the wheelchair 10.

As a feature of the present invention, there can be seen, particularly in FIG. 3, the presence of a space 52 that is intermediate the wheelchair 10 and the walker 12 that has sufficient room to allow a user to walk in the space 52 when the walker 12 is attached to the wheelchair 10.

As can now be seen, the use of the present combination wheelchair/walker can be explained with reference to FIGS. 1-3. In a typical situation, the user can be seated in the wheelchair 10 and there is a desire on the part of the user or the healthcare facility to transition the user from a sitting position on the wheelchair 10 to a standing position supported by a walker 12. In such event, the caregiver can simply attach the walker 12 to the wheelchair 10 through the use of the attachment system that provides an easy mechanical means of positively and readily carrying out that attachment.

Accordingly, to attach the walker 12 to the wheelchair 10, the walker 12 is simply raised vertically by the caregiver and the downwardly directed members 48 are aligned with the hollow attachment sockets 50. By then simply lowering the walker 12, the downwardly directed members 48 enter into the hollow attachment sockets 50, thereby attaching the walker 12 firmly and positively to the wheelchair 10.

At this point, the user can move from the sitting position to the standing position and is still confined within the space 52 so that the user is protected from falling in any direction and the user can hold on to the walker 12 for assistance in rising to the standing position.

The user can then proceed to ambulate by holding on to the upper handle 32 or side supports 34 of the walker and, since the wheelchair 10 is still attached to the walker, the wheelchair 10 is available to catch the user if the user falls backwardly or simply gets tired and wants the comfort and safety of the sitting position on the wheelchair 10.

On the other hand, if the user is feeling comfortable with ambulating in the standing position, the caregiver can detach the walker 12 from the wheelchair 10 by the attachment system, that is, by lifting the walker 12 vertically to disengage the downwardly directed members 48 from the hollow attachment sockets 50 and the wheelchair 10 can be detached so that the user can continue walking assisted only by the walker 12.

Those skilled in the art will readily recognize numerous adaptations and modifications which can be made to the wheelchair and walker combination of the present invention which will result in an improved safety system to enable a user to transition from a sitting to a standing position using the combination wheelchair/walker, yet all of which will fall within the scope and spirit of the present invention as defined in the following claims Accordingly, the invention is to be limited only by the following claims and their equivalents.

What is claimed is:

1. A combination of a wheelchair and a walker mechanically affixed together, the wheelchair comprising a wheelchair frame for supporting a user in a sitting position, a pair of front wheels and a pair of drive wheels rotatably affixed to the frame and being movable to propel the wheelchair over a flat surface, the walker comprising a walker frame having a handle adapted to be grasped by a user, and having at least two wheels that contact the flat surface when supporting a user, the walker having a rear facing toward the wheelchair and a front facing outwardly from the wheelchair, the walker further having a least one downwardly directed member that interfits into at least one hollow attachment socket on the wheelchair, the walker further having a pair of support legs proximate the rear of the walker that independently extend toward a floor and are adapted to support the rear of the walker when detached from the wheelchair in a generally level orientation.

2. The combination as defined in claim 1 wherein the at least one downwardly directed member and the at least one hollow attachment socket comprises a pair of downwardly directed members and a pair of hollow attachment sockets.

3. The combination as defined in claim 2 wherein the pair of downwardly directed members are located along lateral sides of the walker and the pair of hollow attachment sockets are located along lateral sides of the wheelchair.

4. The wheelchair as defined in claim 2 wherein space is provided between the wheelchair and the walker when the walker is affixed to the wheelchair to enable a user to stand and ambulate within the space.

5. A method of allowing a user to transition from a sitting position in a wheelchair to a standing position supported by a walker, the method comprising the steps of:

providing a wheelchair having a wheelchair frame to support a user in a sitting position, the wheelchair frame having drive wheels and support wheels affixed thereto, the wheelchair having a first component of an attachment system, providing a walker comprising a walker frame having front wheels and rear support legs, the walker having a second component of an attachment system that is separate from the rear support legs and located between the support legs and the front wheels, and using the attachment system to attach the walker to and detach the walker from the wheelchair wherein, when detached, the walker is supported on the front wheels and rear support legs in a generally level orientation.

6. The method of claim 5 wherein the step of using the attachment system to attach the walker comprises interfitting together the second component of the attachment system to the first component of the attachment system.

7. The method of claim 5 wherein the step of using the attachment system to detach the walker comprises releasing the second component of the attachment system from the first component of the attachment system.

8. The method of claim 7 wherein the step of releasing the second component from the first component comprises raising the walker vertically to detach the second component for the first component.

9. The method of claim 5 wherein the method further comprises the step of detaching the walker from the wheelchair to allow the user to continue ambulating supported solely by the walker.

10. The method of claim 5 wherein the step of using the attachment system to attach the walker to the wheelchair includes the step of providing a space intermediate the wheelchair and the walker to allow a user to ambulate while positioned within the space.

* * * * *